United States Patent
Kunzeman

[19]

[11] Patent Number: 6,113,193
[45] Date of Patent: Sep. 5, 2000

[54] APPARATUS AND METHOD FOR AUTOMATICALLY REDUCING ENGINE EXHAUST NOISE

[75] Inventor: Joseph D. Kunzeman, Decatur, Ill.

[73] Assignee: Caterpillar Inc., Peoria, Ill.

[21] Appl. No.: 09/241,705

[22] Filed: Feb. 2, 1999

[51] Int. Cl.[7] .................................................. B60P 1/00
[52] U.S. Cl. ........................ 298/1 H; 414/699; 123/357
[58] Field of Search .................... 298/1 H, 22 R; 414/699, 812; 123/357

[56] References Cited

U.S. PATENT DOCUMENTS

| | | | |
|---|---|---|---|
| 2,690,712 | 10/1954 | Foote | 103/16 |
| 3,731,973 | 5/1973 | Kermode | 298/1 H |
| 3,851,727 | 12/1974 | Getz et al. | 181/50 |
| 3,898,806 | 8/1975 | Press | 60/330 |
| 3,913,705 | 10/1975 | Sieving | 181/36 D |
| 3,982,508 | 9/1976 | Norlin et al. | 123/97 R |
| 4,076,099 | 2/1978 | Proksch | 181/264 |
| 4,077,283 | 3/1978 | Hammond | 74/860 |
| 4,124,095 | 11/1978 | Ezure | 187/9 R |
| 4,400,935 | 8/1983 | Louis | 60/431 |
| 4,479,472 | 10/1984 | Shimamura | 123/340 |
| 4,545,449 | 10/1985 | Fujiwara | 180/69.3 |
| 4,640,245 | 2/1987 | Matsuda et al. | 123/339 |
| 4,774,921 | 10/1988 | Sakaguchi et al. | 123/385 |
| 4,792,052 | 12/1988 | Okuda et al. | 212/162 |
| 5,479,908 | 1/1996 | Grinberg et al. | 123/386 |
| 5,586,536 | 12/1996 | Seo et al. | 123/352 |
| 5,797,656 | 8/1998 | Kauk et al. | 298/1 H |
| 5,915,356 | 6/1999 | Oishi et al. | 123/357 |
| 5,967,758 | 10/1999 | Fujii et al. | 417/34 |

*Primary Examiner*—D. Glenn Dayoan
*Assistant Examiner*—Scott A. Carpenter
*Attorney, Agent, or Firm*—Wood, Herron & Evans, L.L.P.

[57] ABSTRACT

An apparatus and method for automatically reducing engine exhaust noise from a dump truck including a heated bed without the additional requirement of diverting the flow of exhaust through a separate muffler apparatus. An engine noise reduction system associated with the truck includes an engine control unit for controlling high idle engine speed parameters of the truck engine. When the truck bed is raised upwardly from an initial lowered position to release a material load from the bed, or hydraulics associated with the truck bed are actuated to raise the bed, the engine control unit automatically lowers the high idle engine speed of the truck engine to reduce engine noise from the truck engine. The high idle engine speed of the truck engine is automatically reset to the standard setting when the truck bed returns to the initial lowered position.

24 Claims, 2 Drawing Sheets

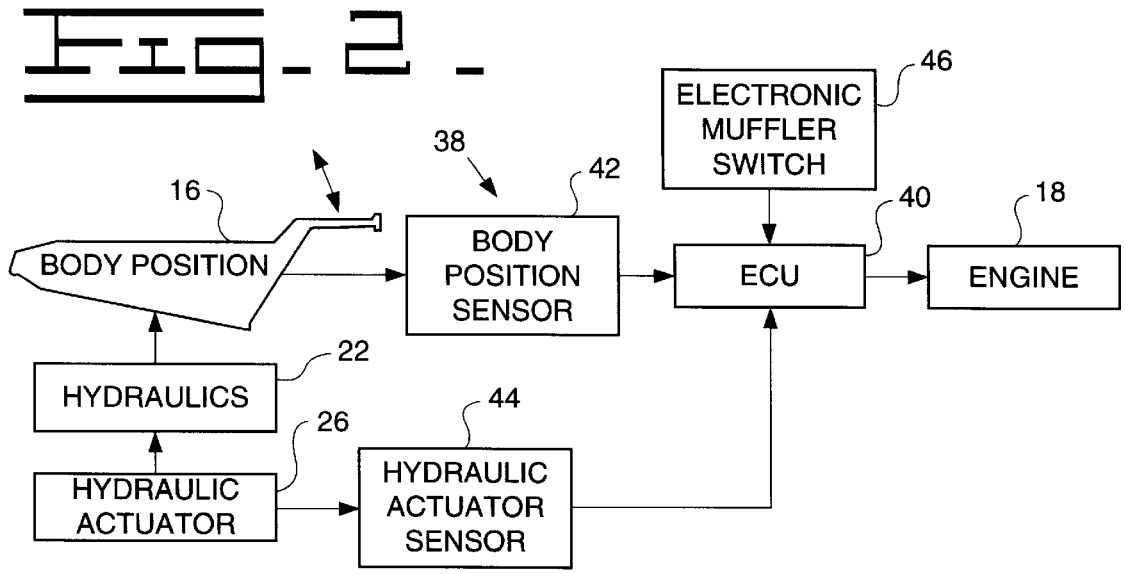
Fig-2-
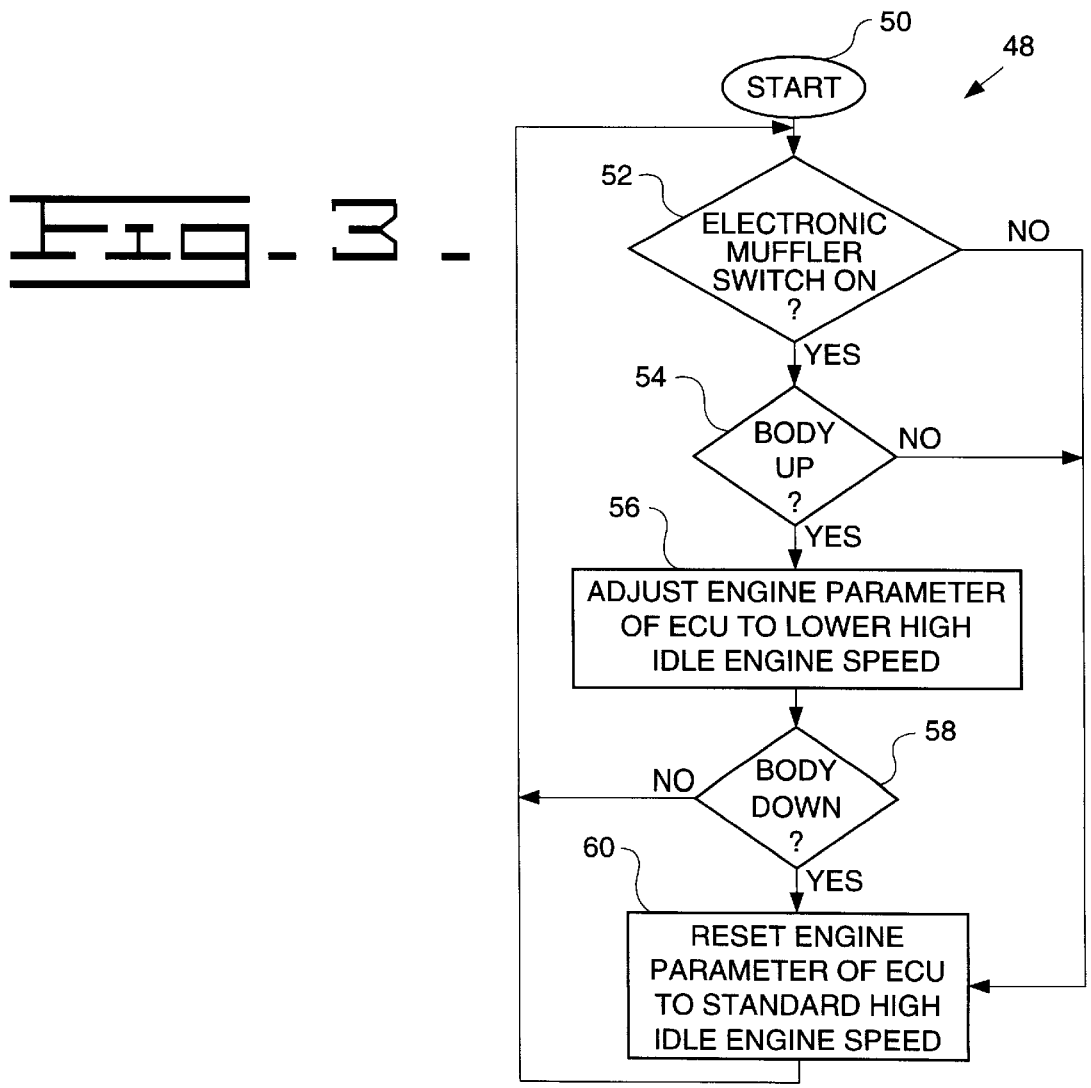
Fig-3-

APPARATUS AND METHOD FOR AUTOMATICALLY REDUCING ENGINE EXHAUST NOISE

TECHINCAL FIELD

The present invention relates generally noise reduction apparatus and methods and, more automatically reducing engine noise of a dump truck including a heated bed.

BACKGROUND ART

Off highway dump trucks are designed to receive and carry meterial within a bed or dump body of the truck. The bed can be raised by a hydraulic system so as to eject the material from the bed at the appropriate time. Thereafter, the bed can be lowered so that additional material may be loaded within the truck bed.

During cold weather conditions, the material within the truck bed has a tendency to adhere to the walls of the bed, thereby resisting ejection of the material from the bed as it is raised during a dumping or spreading operation. To overcome this problem, it is known in the art to provide a duct system within the walls of the bed so that the flow of exhaust from the truck's engine may be directed into the duct system to heat the bed walls and reduce the tendency of material to adhere to the bed. When the dump bed is raised, the flow of exhaust is redirected or channeled through a separate exhaust diverter and muffler to reduce engine exhaust noise during the dumping operation when the exhaust system is disconnected from the duct system. Over the operating life of the dump truck, this exhaust diverter and muffler will eventually wear out and have to be replaced. Thus, there is a need for an engine noise reduction apparatus and method that eliminates the requirement for an exhaust diverter and muffler associated with a dump truck having a heated bed.

The present invention is directed to overcoming one or more of the problems as set forth above.

DISCLOSURE OF THE INVENTION

The present invention overcomes the foregoing and other shotcomings and drawbacks of engine noise reduction systems and methods heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with one aspect of the present invention, an apparatus for automatically reducing engine noise from an engine of a truck is provided. The truck includes a truck bed mounted for pivotal movement between lowered and raised positions through a hydraulic mechanism operatively connected to the truck bed. A selectively movable hydraulic actuator is operatively connected to the hydraulic mechanism for selectively actuating the hydraulic mechanism to move the truck bed between the lowered and raised positions.

The noise reduction apparatus includes a sensor that is operable to detect movement or positioning of the truck bed from the initial lowered position, and to generate an electrical signal in response thereto. An engine control unit is electrically coupled to the sensor and operatively connected to the truck engine for operating the truck engine at a first lower speed and second higher speed. The engine control unit is operable to automatically operate the truck engine at the first lower speed in response to the electrical signal to reduce engine exhaust noise from the truck engine when the truck bed is raised, such as during a dumping or spreading operation. The engine control unit automatically operates the truck engine at the second higher speed when the truck bed is returned to the initial lowered position.

In accordance with another aspect of the present invention, the noise reduction apparatus includes a sensor operable to detect movement of the hydraulic actuator, and to generate an electrical signal in response thereto. The engine control unit is electrically coupled to the sensor and operable to automatically operate the truck engine at the first lower speed in response to the electrical signal to reduce engine noise from the truck engine when the hydraulic actuator is moved to raise the truck bed. The engine control unit automatically operates the truck engine at the second higher speed when the truck bed is returned to the initial lowered position.

The above and other objects, features and advantages of the present invention will become apparent from the following description and the attached drawings.

BRIEF DESCRIPTION OF THE DRAWINGS

For a better understanding of the present invention, reference may be made to the accompanying drawings in which:

FIG. 2 is a schematic view of the noise reduction apparatus incorporated in the truck of FIG. 1; and FIG. 3 is a flow diagram of a main routine performed by the noise reduction apparatus of FIG. 2.

BEST MODE FOR CARRYING OUT THE INVENTION

Figure 1:
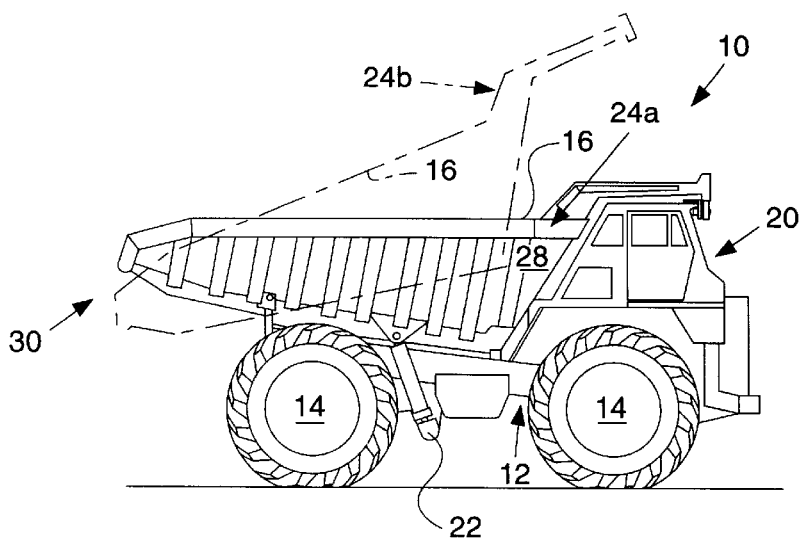
FIG. 1 is a side view of a truck incorporating an engine exhaust noise reduction apparatus in accordance with the principles of the present invention.

With reference to the figures, and to FIG. 1 in particular, a dump truck 10 is shown including a truck from 12 supported on wheels 14, a truck bed or dump body 16, an engine 18 (FIG. 2), and an operator cab 20. Truck bed 16 is pivotally mounted on frame 12 for movement through a hydraulic mechanism 22 between a lowered position as indicated generally at 24a, and a raised position as shown in phantom and indicated generally at 24b.

Truck bed 16 is configured to receive material such as sand, crushed or blasted rock or stone, and other miscellaneous debris, and to contain the material (not shown) during travel of the truck 10 from one location to another with the truck bed 16 positioned in the lowered position 24a. When it is desirable to dump or spread the material from the truck bed 16, the operator actuates a hydraulic actuator 26 (FIG. 2), such as a hoist switch or lever located within the cab 20, that causes the bed 16 to pivotally move upwardly from the lowered position 24a. The raised position 24b of the truck bed 16 is variably positionable between slightly above the lowered position 24a to a fully raised position (not shown). The amount of tilt of the truck bed 16 is selectively determined by the operator for a particular material dumping situation. After the material has been ejected from the bed 16, the bed is returned to the lowered position 24a.

During cold weather conditions, the material within truck bed 16 has a tendency to adhere to walls 28 of the bed and thereby resist ejection from the bed 16 as it is raised from the lowered position 24a. To reduce this undesirable material dumping condition, the truck bed 16 is provided with a duct system as known by those skilled in the art, indicated generally at 30, that receives engine exhaust from the truck engine 18 when the truck 10 is operational and the bed 16 is positioned in the lowered position 24a.

Figure 1A:
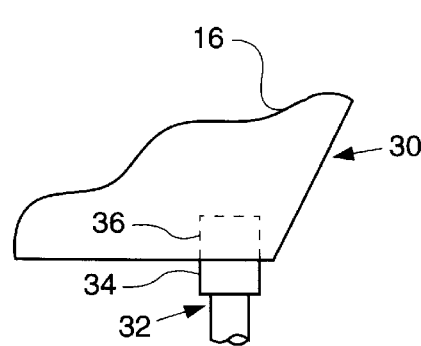
FIGS. 1A and 1B are partial schematic views illustrating the truck exhaust system connected and disconnected from the truck bed duct system, respectively.
Figure 1B:
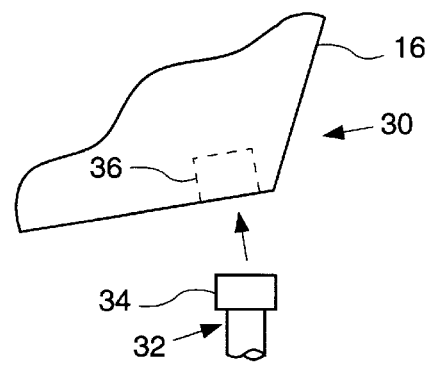

To this end, as shown in FIGS. 1A and 1B, truck 10 includes an exhaust system 32 having an outlet port 34 that communicates with an inlet port 36 of the duct system 30 when the bed 16 is positioned in the lowered position 24a as shown in FIG. 1A. Engine exhaust from truck 10 is directed through the duct system 30 in the lowered position 24a of bed 16 to raise the temperature of the truck bed 16 and thereby reduce the tendency of material to adhere to the walls 28 of the bed 16. When the truck bed 16 is raised from the lowered position 24a as shown in FIG. 1B, the outlet port 34 of the exhaust system 32 disconnects from the inlet port 36 of the duct system 30 and communicates directly with atmosphere without any intervening engine exhaust diverting or muffler structure.

To reduce undesirable engine exhaust noise that may be generated when the truck 10 is operational and the truck bed 16 is raised from the lowered position 24a, truck 10 includes a noise reduction system, indicated generally at 38 in FIG. 2, that automatically reduces engine exhaust noise when the bed 16 is tilted upwardly from the lowered position 24a, such as during a material dumping or spreading operation. Noise reduction system 38 includes a computer-implemented engine control unit 40 that is operatively connected to the engine 18 for controlling overall operating parameters of the engine, including the high idle engine speed parameters of the engine 18 as described in detailed below.

More particularly, engine control unit 40 preferably includes at least two high idle engine speed settings contained in memory (not shown) of the control unit 40 that are each selectively and alternatively applied to the engine 18 during different truck operating conditions. One setting preferably operates the engine 18 at a standard high idle engine speed in a range between about 2150 and about 2305 revolutions per minute, while the other setting preferably operates the engine 18 at a lower high idle engine speed in a range between about 1700 and about 1900 revolutions per minute. It will be appreciated by those of ordinary skill in the art that the engine exhaust noise generated by engine 18 will be reduced at the lower high idle engine speed as compared to the high idle engine speed. It will also be appreciated by those of ordinary skill in the art that these high idle engine speed ranges may be varied within the operating limits of engine 18 and the desired reduction in engine exhaust noise without departing from the spirit and scope of the present invention.

Further referring to FIG. 2, noise reduction system 38 includes a body position sensor 42 associated with truck 10 that is operable to detect movement or positioning of truck bed 16 from the lowered position 24a. Body position sensor 42 may be a non-contact hall-effect switch that changes state when the truck bed 16 is initially moved from the lowered position 24a, and vice-versa when the truck bed 16 is returned to the lowered position 24a from a raised position. Alternatively, body position sensor 42 may be a position sensor, that is operable to measure or detect the angular or tilted position of the truck bed 16 relative to the frame 12 or some other reference point. In yet another alternative embodiment, the body position sensor 42 may be one or more limit switches that are actuated when the truck bed 16 moves past or assumes a predetermined position. Those of ordinary skill in the art will appreciate other equivalent body position sensor structures that may be employed to detect movement or position of the truck bed 16 in accordance with the principles of the present invention. Body position sensor 42 is electrically coupled to engine control unit 40, and is operable to apply an electrical signal to the engine control unit 40 in response to a predetermined movement or positioning of truck bed 16 from the lowered position 24a.

Noise reduction system 38 also preferably includes a hydraulic actuator sensor 44 that is operable to detect operator movement or modulation of the hydraulic actuator 26. Hydraulic actuator 28 preferably includes a first manually selectable position for selectively raising the truck bed 16 from the lowered position 24a to a raised position, and a second manually selectable position for selectively lowering the truck bed 16 to the lowered position 24a from a raised position. Hydraulic actuator 26 also includes a float position which is the normal position of actuator 26 when the bed is down, and a hold position which stops truck bed 16 in any position and holds it there. Hydraulic actuator sensor 44 may be a pressure switch, motion detector or other equivalent hydraulic actuator sensor structure known by those of ordinary skill in the art that is operable to detect operator movement or modulation of the hydraulic actuator 26. Hydraulic actuator sensor 44 is electrically coupled to engine control unit 40 and is operable to apply an electrical signal to the engine control unit in response to a predetermined operator movement of hydraulic actuator 26.

With further reference to FIG. 2, noise reduction system 38 also includes a manually actuatable electronic muffler switch 46 that is electrically coupled to engine control unit 40. Electronic muffler switch 46, which may be a single pole single throw non-momentary mechanical switch, is preferably located on a dash (not show) within cab 20, and is operable to apply an electrical signal to engine control unit 40 upon manual actuation of the switch 46 to a predetermined position.

With reference now to FIG. 3, operation of noise reduction system 38 to automatically reduce exhaust noise of engine 18 when the truck bed 16 is raised from the lowered position 24a will now be described in connection will main program routine 48 that is stored in memory (not shown) of engine control unit 40 and executed by control unit 40 in accordance with the principles of the present invention. More particularly, upon start-up of truck 10, engine control unit 40 is initialized at block 50. After initialization, control is passed to block 52 at which point engine control unit 40 determines whether the electronic muffler switch 46 has been turned on by the operator to enable the automatic noises reduction capability of noise reduction system 38.

If the electronic muffler switch 46 is turned on, control passes to block 54 to determine whether the truck bed 16 has been raised from the lowered position 24a as detected by body position sensor 42. If it is determined at block 54 that the truck bed 16 has been raised, control passes to block 56 at which point engine control unit 40 adjusts the high idle engine speed parameter of engine 18 to the lower high idle engine speed setting. In this way, the noise reduction system 38 automatically reduces engine exhaust noise from engine 18 whenever the truck bed 16 is raised from the lowered position 24a, such as during a dumping or spreading operation when the exhaust system 32 is disconnected from the duct system 30.

At block 58, a determination is made whether the truck best 16 has been moved or returned to the lowered position 24a. If the truck bed 16 has been moved to the lowered position 24a, control passes to block 60 at which point the engine control unit 40 adjusts or resets the high idle engine speed parameter to the standard high idle engine speed setting. In the lowered position 24a of truck bed 16, exhaust from engine 18 is directed to the duct system 30 as described in detail above.

If it is determined at block 58 that the truck bed 16 has not been moved to the lowered position 24a, control passes back to block 52 to determine whether the electronic muffler switch 46 is still turned on. If the electronic muffler switch 46 is turned off during the cycle of main program routine 48, the exhaust noise reduction capability of noise reduction system 40 is disabled, and the engine control unit 40 is disabled, and the engine control unit 40 resets the high speed idle parameter to the standard high speed idle setting. Thus, the electronic muffler switch 46 is provided to permit the noise reduction system 38 to be enabled and disabled as desired by the operator.

Alternatively, it will be appreciated that engine control unit 40 may automatically reduce engine exhaust noise from engine 18 in response to a predetermined operator movement of the hydraulic actuator 26, as detected by the hydraulic actuator sensor 44 as described in detail above. In this alternative embodiment, the main program routine 48 includes a control block (not shown) that determines whether the hydraulic actuator 26 has been moved to the first manually selectable position to raise truck bed 16. If yes, the engine control unit 40 adjusts the high idle engine speed parameter of engine 18 to the lower high speed idle setting as discussed in detail above with reference to control block 56. Regardless of any additional modulation of actuator 26 to any position, the lower high speed idle setting is maintained by engine control block 58 that the bed 16 has been moved to the lowered position 24a or the electronic muffler switch 46 has been turned off.

While not shown, it will be appreciated that other control blocks may be incorporated into main program routine 48, or the function of control blocks combined, without departing from the spirit and scope of the present invention. For example, a transmission sensor (not shown) may be included in noise reduction system 38 such that the exhaust noise reduction capability of noise reduction system 38 may be enabled only when the transmission is in "neutral". This may be provided to prevent movement of the truck 10 when the engine control unit 38 has set the lower high speed idle parameter as a result of upward tilting movement of the truck bed 16.

With reference to the drawings and in operation, the operator of the truck 10 turns on the electronic muffler switch 46 to enable the engine noise reduction capability of noise reduction system 38 associated with the truck 10. As the truck bed 16 is moved upwardly from the lowered position sensor 42 or the hydraulic actuator sensor 44, respectively, applies an electrical signal to the engine control unit 40. In response to the electrical signal, the engine control unit 40 adjusts the high idle engine speed parameter of engine 18 to the lower high idle speed engine setting. In this way, the noise reduction system 38 automatically reduces engines exhaust noise from engine 18 whenever the truck bed 16 is raised from the lowered position 24a, such as during a material dumping or spreading operation. The engine control unit 40 resets the high idle engine speed parameter of engine 18 to the standard high idle speed setting whenever the truck bed 16 is moved or returned to the lowered position 24a or the electronic muffler switch is turned off by the operator. The noise reduction system 38 of the present invention automatically reduces exhaust noise from engine 18 without the requirement of diverting the flow of exhaust through a separated muffler apparatus.

Other aspects, objects and advantages of the present invention can be obtained from a study of the drawings, the disclosure and the appended claims.

What is claimed is:

1. An apparatus for automatically reducing engine noise from an engine of a truck having a truck bed mounted for pivotal movement between lowered and raised positions, comprising:

a sensor operable to detect movement of the truck bed from the lowered position and to generate an electrical signal in response thereto; and an engine control unit electrically coupled to the sensor and operatively connected to the truck engine for operating the truck engine at a first lower speed and a second higher speed, the engine control unit being operable to automatically operate the truck engine at the first lower speed in response to the electrical signal to reduce engine noise from the truck engine.

2. The apparatus of claim 1 further including a hydraulic mechanism operatively connected to the truck bed for moving the truck bed between the lowered and raised position.

3. The apparatus of claim 2 further including a selectively movable hydraulic actuator operatively connected to the hydraulic mechanism for selectively actuating the hydraulic mechanism to move the truck bed between the lowered and raised positions.

4. The apparatus of claim 1 further including a manually actuatable device electrically coupled to the engine control unit for enabling and disabling operation of the engine control unit to automatically operate the truck engine at the first lower speed.

5. The apparatus of claim 1 wherein the first lower speed of the truck engine is in a range between about 1700 and about 1900 revolutions per minute.

6. The apparatus of claim 1 wherein the second higher speed of the truck engine is in a range between about 2150 and about 2350 revolutions per minute.

7. The apparatus of claim 1 further including an engine exhaust outlet port operatively connected to the truck bed in the lowered position of the truck bed, and disconnected from the truck bed in the raised position of the truck bed.

8. The apparatus of claim 7 wherein the engine exhaust outlet port is configured to communicate directly with atmosphere when the engine exhaust outlet port is disconnected from the truck bed in the raised position of the truck bed.

9. An apparatus for automatically reducing engine noise from an engine of a truck having a truck bed mounted for pivotal movement between lowered and raised positions, comprising:

a hydraulic mechanism operatively connected to the truck bed for moving the truck bed between the lowered and raised positions;

a selectively movable hydraulic actuator operatively connected to the hydraulic mechanism for selectively actuating the hydraulic mechanism to move the truck bed between the lowered and raised positions;

a sensor operable to detect movement of the hydraulic actuator and to generate an electrical signal in response thereto; and an engine control unit electrically coupled to the sensor and operatively connected to the truck engine for operatively the truck engine at a first lower speed and a second higher speed, the engine control unit being operable to automatically operate the truck engine at the first lower speed in response to the electrical signal to reduce engine noise from the truck engine.

10. The apparatus of claim 9 further including a manually actuatable device electrically coupled to the engine control unit for enabling and disabling operation of the engine control unit to automatically operate the truck engine at the first lower speed.

11. The apparatus of claim 9 wherein the first lower speed of the truck engine is in a range between about 1700 and about 1900 revolutions per minute.

12. The apparatus of claim 9 wherein the second higher speed of the truck engine is in a range between about 2150 and about 2350 revolutions per minute.

13. The apparatus of claim 9 further including an engine exhaust outlet port operatively connected to the truck bed in the lowered position of the truck bed, and disconnected from the truck bed in the raised position of the truck bed.

14. The apparatus of claim 13 wherein the engine exhaust outlet port is configured to communicate directly with atmosphere when the engine exhaust outlet port is disconnected from the truck bed in the raised position of the truck bed.

15. A method for automatically reducing engine noise from an engine of a truck having a truck bed mounted for pivotal movement between lowered and raised positions, comprising the steps of:

detecting movement of the truck bed from the lowered position; and automatically reducing engine speed of the truck engine upon detecting movement of the truck bed from the lowered position.

16. The method of claim 15 further comprising the step of detecting movement of the truck bed to the lowered position.

17. The method of claim 16 further comprising the step of automatically raising engine speed of the truck engine upon detecting movement of the truck bed to the lowered position.

18. The method of claim 15 further including the step of selectively enabling and disabling the automatic reduction of engine speed.

19. A method for automatically reducing engine noise from an engine of a truck having a truck bed mounted for pivotal movement between lowered and raised positions, comprising the steps of:

operatively connecting a hydraulic mechanism to the truck bed for moving the truck bed between the lowered and raised positions;

operatively connecting a selectively movable hydraulic actuator to the hydraulic mechanism for selectively actuating the hydraulic mechanism to move the truck bed between the lowered and raised positions;

detecting movement of the hydraulic actuator; and automatically reducing engine speed of the truck engine upon detecting movement of the hydraulic actuator.

20. The method of claim 19 wherein the hydraulic actuator has a first position for moving the truck bed from the lowered position to the raised position and a second position for moving the truck bed from the raised position to the lowered position.

21. The method of claim 20 further comprising the step of automatically reducing engine speed of the truck engine upon detecting movement of the hydraulic actuator to the first position.

22. The method of claim 20 further comprising the step of automatically raising engine speed of the truck engine upon detecting movement of the hydraulic actuator to the second position.

23. The method of claim 19 further including the step of selectively enabling and disabling the automatic reduction of engine speed.

24. A dump truck, comprising:

a moveable truck frame;

a truck bed mounted for pivotal movement relatived to the truck frame between lowered and raised positions;

an engine supported by the truck frame; and an apparatus for automatically reducing engine noise from the engine of the truck according to claim 1.

* * * * *